United States Patent [19]

Ueda

[11] Patent Number: 5,121,490
[45] Date of Patent: Jun. 9, 1992

[54] BIT AND WORD MEMORY ALLOCATION FOR A PROGRAMMABLE CONTROLLER

[75] Inventor: Akihisa Ueda, Shibatashi, Japan
[73] Assignee: Hitachi, Ltd., Tokyo, Japan
[21] Appl. No.: 6,020
[22] Filed: Jan. 22, 1987

[30] Foreign Application Priority Data

Jan. 22, 1986 [JP] Japan .............. 61-10026

[51] Int. Cl.⁵ .............................. G06F 12/04
[52] U.S. Cl. .............................. 395/425; 364/DIG. 1;
  364/254.9; 364/255.1; 364/255.4; 364/232.9;
  364/245.5; 364/245.9; 364/246; 364/246.5
[58] Field of Search ... 364/200 MS File, 900 MS File;
  365/189.05, 238.5

[56] References Cited

U.S. PATENT DOCUMENTS

| | | | |
|---|---|---|---|
| 3,631,405 | 12/1971 | Hoff et al. | 364/200 |
| 4,028,679 | 6/1977 | Divine | 364/900 |
| 4,079,451 | 3/1978 | Woods et al. | 364/200 |
| 4,099,253 | 7/1978 | Dooley, Jr. | 364/900 |
| 4,282,584 | 8/1981 | Brown et al. | 364/900 |
| 4,648,068 | 3/1987 | Ninnemann et al. | 364/900 |
| 4,663,735 | 5/1987 | Novak et al. | 364/900 |
| 4,667,305 | 5/1987 | Dill et al. | 364/900 |
| 4,688,191 | 8/1987 | Conners | 364/900 |
| 5,034,900 | 7/1991 | Kimura et al. | 364/518 |

FOREIGN PATENT DOCUMENTS 56-57111 5/1981 Japan .
57-23110 2/1982 Japan .

*Primary Examiner*—Kevin A. Kriess
*Attorney, Agent, or Firm*—Fay, Sharpe, Beall, Fagan, Minnich & McKee

[57] ABSTRACT

A programmable controller which handles both bit data and word data includes a memory having a memory area which is divided into blocks each having a predetermined length which corresponds to the number of bits constituting one word. An address is provided to each of the blocks, and one bit data or one word data is selectively stored in each of the blocks. Thus, the memory area is provided with flexibility, and the preparation of a program is facilitated.

13 Claims, 7 Drawing Sheets

FIG. 1

| ADDRESS | BIT 7 6 5 4 3 2 1 0 |
|---|---|
| AAA0 | B1 |
| AAA1 | B2 |
| AAA2 | B3 |
| AAA3 | B4 |
| AAA4 | B5 |

FIG. 2

| ADDRESS | BIT 7 6 5 4 3 2 1 0 |
|---|---|
| AAA0 | W1 |
| AAA1 | W2 |
| AAA2 | W3 |

FIG. 3

| ADDRESS | BIT 7 6 5 4 3 2 1 0 |
|---|---|
| AAA0 | W1 |
| AAA1 | B2 |
| AAA2 | B3 |
| AAA3 | B4 |
| AAA4 | B5 |
| AAA5 | B6 |
| AAA6 | W7 |
| AAA7 | W8 |

FIG. 6

| INTERNAL OUTPUT | ADDRESS | BIT (64 POINTS) | WORD (64 WORDS) |
|---|---|---|---|
| | A A A 0 | B1 | W1 |
| | A A A 1 | B2 | W2 |
| | A A A 2 | B3 | W3 |
| | ⋮ | ⋮ | ⋮ |
| | A A D F | B64 | W64 |

FIG. 7

| ADDRESS | BIT 7 | 6 | 5 | 4 | 3 | 2 | 1 | 0 |
|---|---|---|---|---|---|---|---|---|
| A A A 0 | B8 | B7 | B6 | B5 | B4 | B3 | B2 | B1 |
| A A A 1 | B16 | B15 | B14 | B13 | B12 | B11 | B10 | B9 |
| A A A 2 | B24 | B23 | B22 | B21 | B20 | B19 | B18 | B17 |
| A A A 3 | B32 | B31 | B30 | B29 | B28 | B27 | B26 | B25 |

FIG. 8

| ADDRESS | BIT 7 6 5 4 3 2 1 0 |
|---|---|
| A A A 0 | W1 |
| A A A 1 | W2 |
| A A A 2 | W3 |

FIG. 9 PRIOR ART

| ADDRESS | BIT 7 | 6 | 5 | 4 | 3 | 2 | 1 | 0 |
|---|---|---|---|---|---|---|---|---|
| A A A 0 | W1 | | | | | | | |
| A A A 1 | | | | B13 | B12 | B11 | B10 | B9 |
| A A A 2 | W3 | | | | | | | |
| A A A 3 | W4 | | | | | | | |

FIG. 15
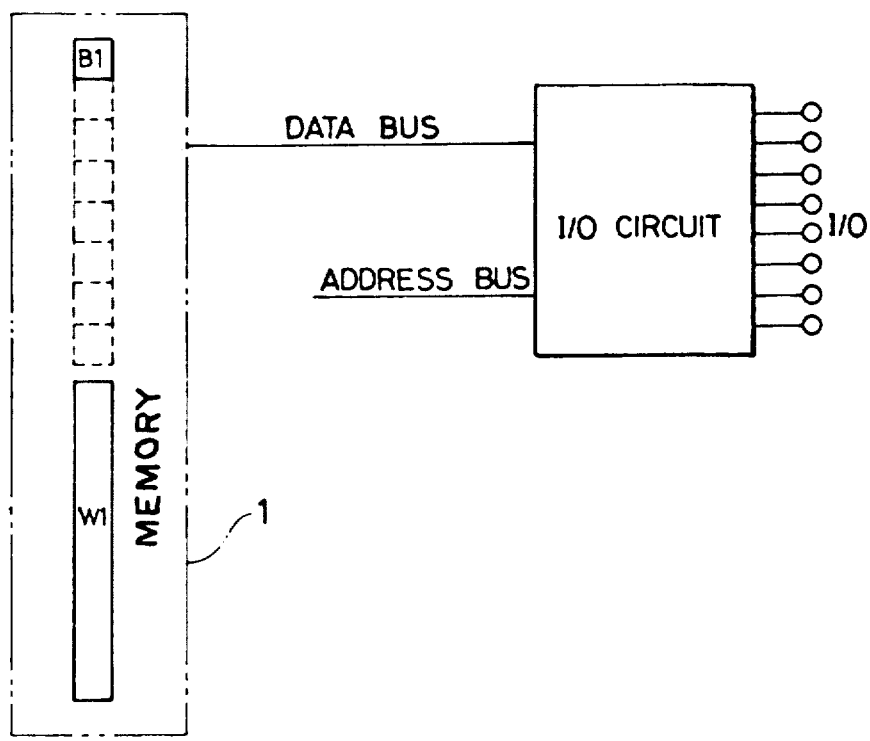
FIG. 16
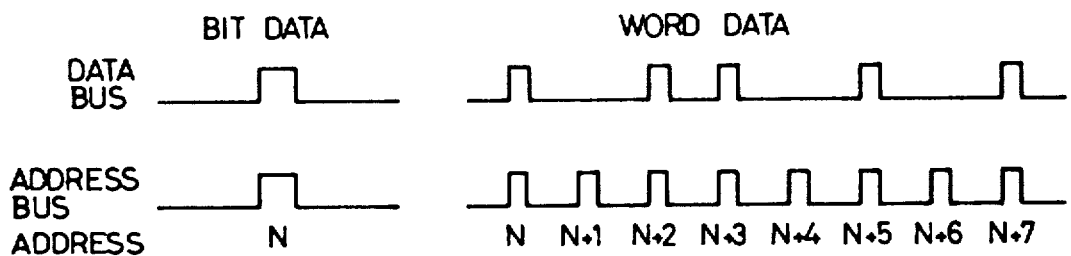
FIG. 17
| INTERNAL OUTPUT | ADDRESS | BIT (64 POINTS) | WORD (8 WORDS) |
|---|---|---|---|
| | A A A 0 | B1 ~ B8 | W1 |
| | A A A 1 | B9 ~ B16 | W2 |
| | A A A 2 | B17 ~ B24 | W3 |
| | ⎧ | ⎧ | ⎧ |
| | A A A 7 | B57 ~ B64 | W8 |

FIG. 18

| | ADDRESS | BIT (64 POINTS) | WORD (8 WORDS) |
|---|---|---|---|
| INTERNAL OUTPUT | A A A 0 | B1 | W1 |
| | A A A 1 | B2 | |
| | A A A 2 | B3 | |
| | A A A 3 | B4 | |
| | A A A 4 | B5 | |
| | A A A 5 | B6 | |
| | A A A 6 | B7 | |
| | A A A 7 | B8 | |
| | A A A 8 | B9 | W2 |
| | A A A 9 | B10 | |
| | A A A A | B11 | |
| | A A A B | B12 | |
| | A A A C | B13 | |
| | A A A D | B14 | |
| | A A A E | B15 | |
| | A A A F | B16 | |
| | ≀ | ≀ | ≀ |
| | A A D 8 | B57 | W8 |
| | A A D 9 | B58 | |
| | ≀ | ≀ | |
| | A A D F | B64 | |

BIT AND WORD MEMORY ALLOCATION FOR A PROGRAMMABLE CONTROLLER

BACKGROUND OF THE INVENTION

When both bit data and word data are handled in a conventional programmable controller (hereinafter abbreviated to a "PCS"), it has heretofore been general practice to handle them separately from each other or handle word data as a set of pieces of bit data irrespective of whether the system is a small-scale PCS or a large-scale PCS. Thus, no consideration has heretofore been taken to facilitation of programming and simplification of the circuit configuration.

In the conventional programming, it is general practice to set an area for outputting bit data and an area for outputting word data separately from each other. This conventional method suffers, however, from the following problem. Since each of the above-described areas is determined in advance, it is impossible to cope with a change in the ratio in size between bit data memory area and word data memory area which may occur due to the difference between users' programs. Accordingly, it is impossible with the above-described conventional method to satisfy a specification demanded by each individual user. In addition, when the program is changed, after a PCS has been delivered to a user, so that the amount of bit data or word data is excessively large, such data cannot be accommodated in a predetermined area, which means that it is impossible to store the program, disadvantageously.

It should be noted that examples of prior arts related to the device of the type described above include those disclosed in Japanese Patent Laid-Open Nos. 57111/1981 and 23110/1982.

SUMMARY OF THE INVENTION

It is a primary object of the present invention to provide a PCS which is capable of handling both bit data and word data with a simplified circuit configuration and which is designed to facilitate programming.

The present invention relates to a programmable controller (PCS) which handles both bit data and word data and, more particularly, to a PCS having a storage means which is suitable for facilitating programming in a small-scale PCS.

The present invention provides a programmable controller including a memory and arranged to handle both bit data and word data, the memory having a memory area for storing the bit and word data, the memory area being divided into a number of blocks each having a predetermined length which corresponds to the number of bits constituting one word, and each block being provided with an address.

According to the present invention, it is possible to handle both bit data and word data in the same way without any distinguishment in various kinds of data processing such as programming carried out by a user, reading/writing data in relation to external input/output circuits and calculation. Accordingly, it is possible to realize facilitation of programming which is particularly demanded in small-scale PCSs. In addition, since data can be input and output in relation to external input/output circuits with a simplified circuit configuration, it is possible to obtain a programmable controller of high reliability at reduced costs.

BRIEF DESCRIPTION OF THE DRAWINGS

FIGS. 1 and 2 respectively show bit data and word data stored in respective memory areas in accordance with one embodiment of the present invention;

FIG. 3 shows bit data and word data stored together in one memory area in accordance with the embodiment of the present invention;

FIG. 6 shows the state of the internal output in the embodiment of the present invention;

FIGS. 7 and 8 respectively show bit data and word data stored in respective memory areas in a large- or medium-scale PCS;

FIG. 9 shows bit data and word data stored together in one memory area in a large- or medium-scale PCS;

FIGS. 12 and 13 respectively show bit data and word data stored in respective memory areas in a small-scale PCS;

FIG. 14 shows bit data and word data stored together in one memory area in a small-scale PCS;

FIG. 15 shows the way in which data is exchanged between storage and an input/output circuit in a small-scale PCS;

FIG. 16 is a time chart showing signals transmitted through data and address buses in a small-scale PCS;

FIG. 17 shows the state of the internal output in a large- or medium-scale PCS; and FIG. 18 shows the state of the internal output in a small-scale PCS.

DESCRIPTION OF THE PREFERRED EMBODIMENTS

Figure 4:
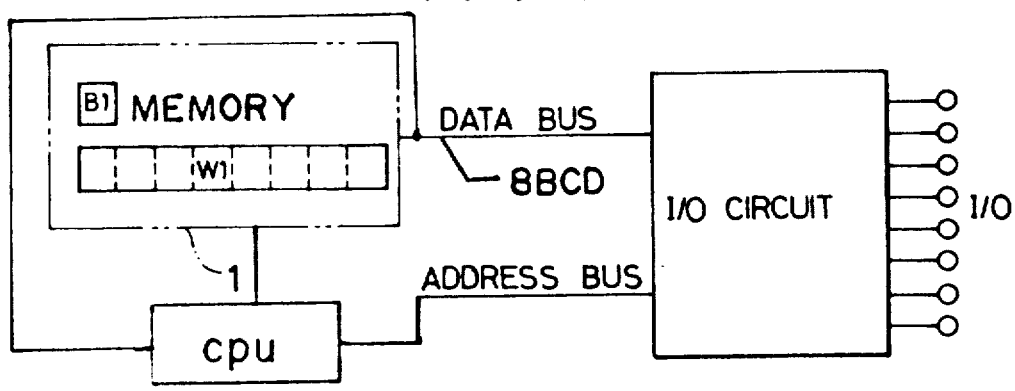
FIG. 4 shows the way in which data is exchanged between storage and an input/output circuit according to the embodiment of the present invention.
Figure 5:
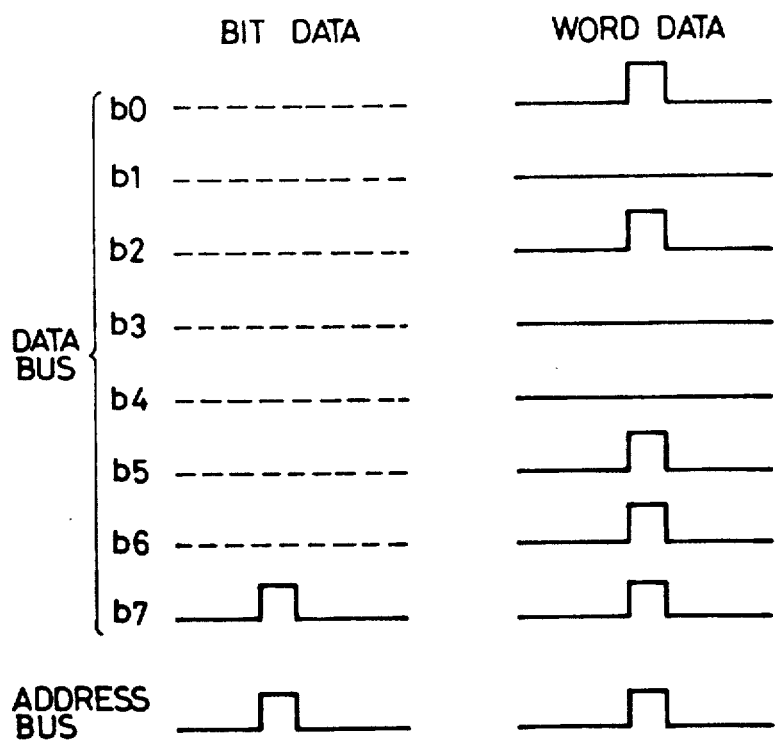
FIG. 5 is a time chart showing signals transmitted through data and address buses in the embodiment of the present invention.

Data which is handled by a PCS includes: bit data concerning, for example, an input representing the ON/OFF state of a switch and an output for starting/stopping a motor; and word data concerning, for example, an input representing a temperature value, an output for controlling the angle of opening of a valve and the result of comparison of a count. Many small-scale PCSs handle bit data alone. However, it has become essential for small-scale PCSs to handle also word data in order to widen the range within which they can process data.

In handling bit data and word data in PCSs, critical consideration lies in memory assignment of data and exchange of data between a storage and an input/output (I/O) circuit, and the memory assignment is related directly to programming carried out by a user.

The memory assignment of data will first be explained below.

Figures 12, 13, 14:
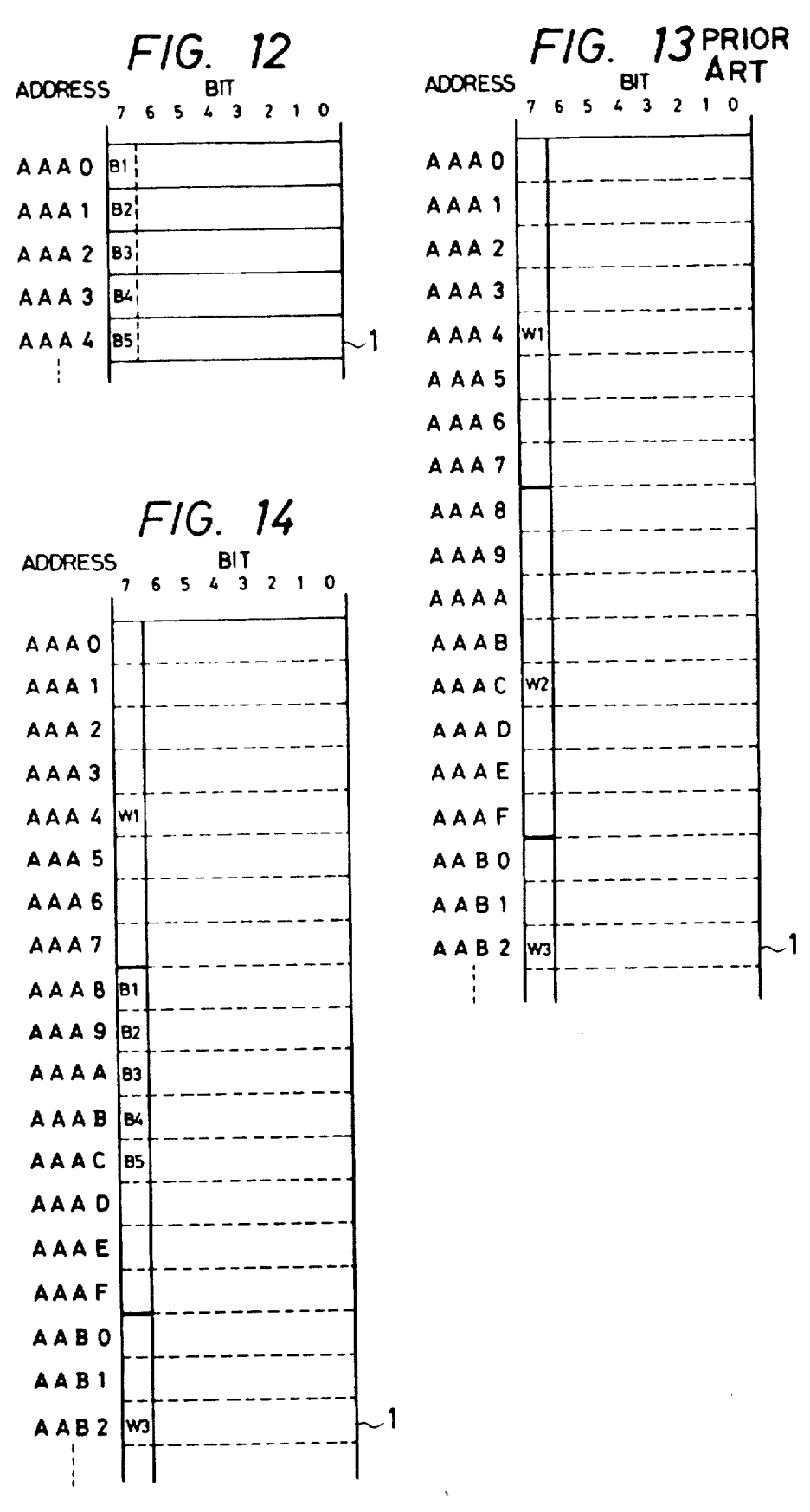

There are two methods of assigning bit data to a memory as shown in FIGS. 7 and 12. In the method shown in FIG. 12, the seventh bit in each address is assigned to each bit of the five bit data items B1 to B5. Accordingly, a memory area for five addresses from AAA0 to AAA4 is needed for five bit data items, for example, B1 to B5. In this case, the bit 0 to the bit 6 are not used. In the method shown in FIG. 7, on the other hand, a memory area for one address AAA0 is assigned to bit data from B1 to B8, and a memory area for another address AAA1 is assigned to the next bit data from B9 to B15. In this way, memory areas are successively assigned to subsequent bit data items. In this case, eight bit data items are stored in a memory area for one address alone, and all the memory area is used. Comparison between the methods respectively shown in FIGS. 12 and 7 finds that the method shown in FIG. 7 involves higher memory utilizing efficiency and enables data to be stored in a memory area which is an eighth of that in the case of the method shown in FIG. 12. However, when the bit data is processed, the method shown in FIG. 7 necessitates taking out a necessary bit from the 8-bit data at the address, which means that the method shown in FIG. 12 is easier than the method shown in FIG. 7 and involves a higher processing speed than that in the latter. There are also two methods of assigning word data to a memory as shown in FIGS. 8 and 13. In the method shown in FIG. 13, only the seventh bit in each memory area is used, and eight addresses, for example, from AAA0 to AAA7, are needed for one word. In this method, the bit 0 to the bit 6 are not used in a manner similar to that in the method shown in FIG. 12. In the method shown in FIG. 8, one address is assigned to one word, and therefore all the memory area is used efficiently. In general, the method shown in FIG. 8 is superior to the method shown in FIG. 13, but the latter has the merit that the same hardware arrangement as that for the method shown in FIG. 12 can be employed.

In the course of accomplishing this invention, the present inventor examined a method obtained by combining together the two methods shown in FIGS. 7 and 8 and a method obtained by combining together the two methods shown in FIGS. 12 and 13. The combination of the methods shown in FIGS. 7 and 8 was mainly examined from the viewpoint of memory utilizing efficiency. In general, one memory area is fixedly used for word data, while another memory area is fixedly used for bit data, and a predetermined memory area is allowed to be used for both bit data and word data for the purpose of increasing flexibility. Accordingly, when a user uses one word in programming, a memory area for eight bit data items becomes impossible to use, and this hinders the device from being handled easily.

More specifically, when word data and bit data are mixed in a program, for example, when one word data, five bit data items and one word data are successively stored from the address AAA0 in the memory, one word data occupies a memory area for eight bit data items as shown in FIG. 9. Further, since one word data cannot be stored in such a manner that it is scattered over two consecutive addresses, when bit data is present between two word data items as shown in FIG. 9, if the number of bit data items is smaller than eight, there are blank bits at the address where the bit data is stored, resulting in a lowering of the memory utilizing efficiency. In addition, since word data and bit data are mixed together, numbers which are consecutively put to word and bit data items stored at respective addresses are not necessarily coincident with the corresponding address numbers, which involves much time and labor in preparation of a program, disadvantageously.

On the other hand, the combination of the methods shown in FIGS. 12 and 13 enables the conventional hardware to be used but requires a relatively large memory area to store word data, which means that the memory utilizing efficiency is disadvantageously low. Accordingly, this method also fails to enable the user to handle the device easily in a manner similar to that in the case of the combination of the methods shown in FIGS. 7 and 8.

More specifically, when word data and bit data are mixed in a program as in the case of the combination of the methods shown in FIGS. 7 and 8, for example, when one word data, five bit data items and one word data are successively stored from the address AAA0, addresses are divided into blocks each consisting of a number of addresses which is equal to the number of bits constituting one word data, and either word data or bit data is stored in each block as shown in FIG. 14. In the example shown in FIG. 14, word data W1 is stored from the address AAA0 to the address AAA7, and bit data items B1 to B5 are respectively stored at the addresses AAA8 to AAAC. The addresses AAAD, AAAE and AAAF are blank addresses, and the subsequent word data W3 is stored from the address AAB0 to the address AAB7. In this case, if bit data items are stored at all the addresses AAA0 to AAA7, the numbers B1 to B8 are put to these bit data items, respectively. Accordingly, the number B9 is put to the bit data item which is stored at the ninth address AAA8, and the numbers B10 to B13 are put to the following bit data items, respectively. Similarly, if word data items are stored at all the addresses AAA0 to AAAF, the word data which is stored from the address AAB0 to the address AAB7 is the third word data, and the number W3 is therefore put to this word data. Since one word data cannot be stored in such a manner that it is scattered over two consecutive address blocks each consisting of eight addresses, if the number of a series of bit data items is less than eight, there are blank addresses, so that the memory utilizing efficiency is further deteriorated in the case of a program in which word data and bit data are mixed together. In this example also, since word data and bit data are mixed together, numbers which are consecutively put to word and bit data items stored at respective addresses are not necessarily coincident with the corresponding address numbers and may be inconsecutive, which involves much time and labor in preparation of a program, disadvantageously.

The exchange of data between a storage and an input/output circuit will next be explained. There are two methods, which are respectively shown in FIGS. 10 and 15, respectively corresponding to the combination of the methods shown in FIGS. 7 and 8 are the combination of the methods shown in FIGS. 12 and 13.

Figure 10:
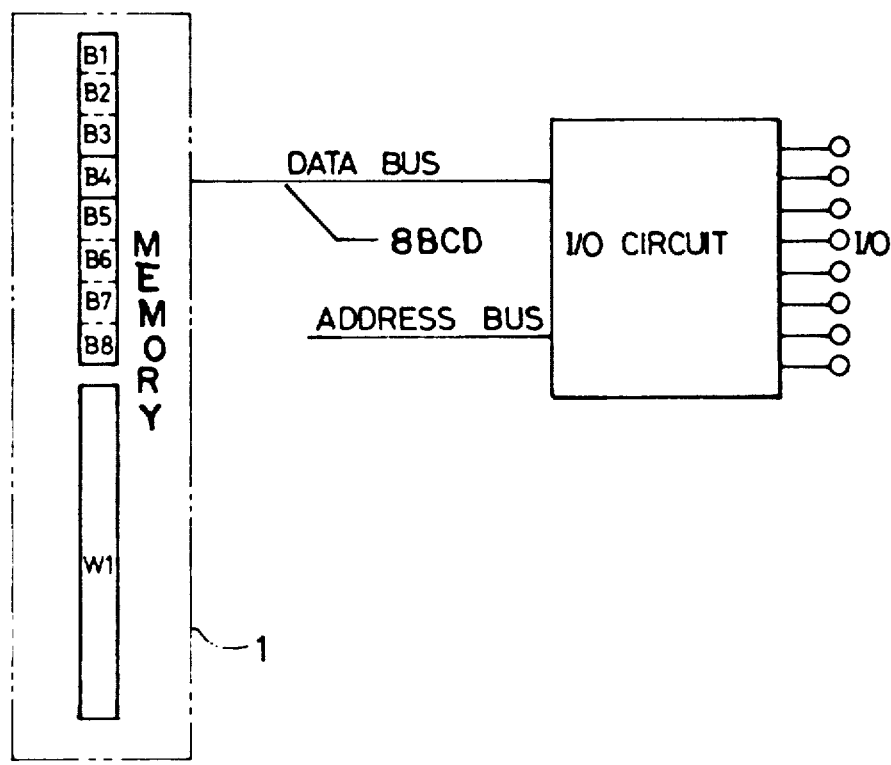
FIG. 10 shows the way in which data is exchanged between storage and an input/output circuit in a large- or medium-scale PCS.

In the method shown in FIG. 10, there are eight data bus lines and therefore word data can be handled in parallel as it is in response to one address signal. As to bit data, however, since data at one address contains eight bit data items, it is necessary to take out one bit from the eight-bit data, which means that the circuit configuration is complicated, but the address space can be utilized efficiently.

Figure 11:
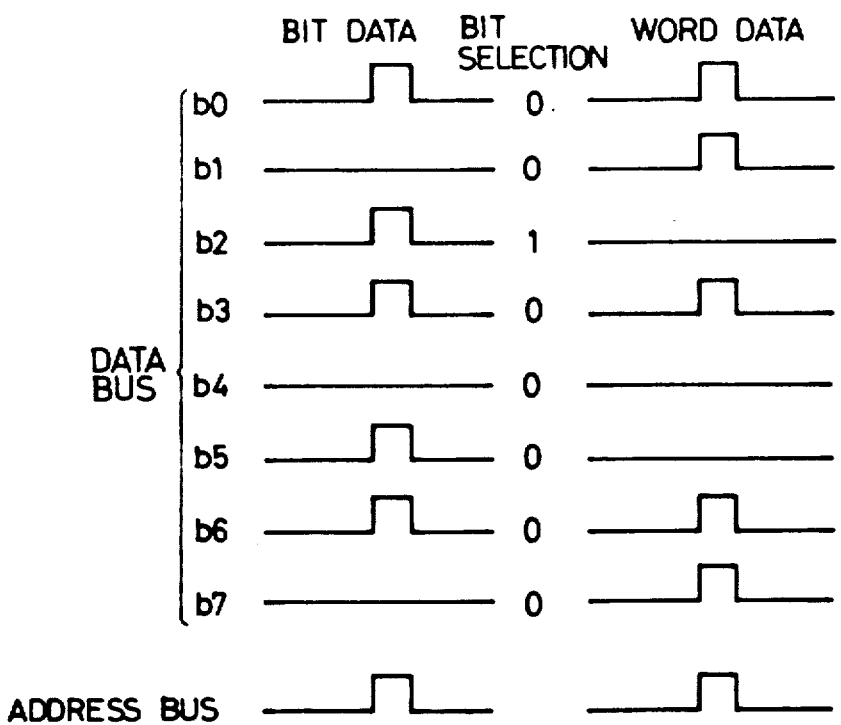
FIG. 11 is a time chart showing signals transmitted through data and address buses in a large- or medium-scale PCS.

FIG. 11 exemplarily shows signals transmitted through data and address buses shown in FIG. 10. If bit data has been stored at a particular address, when a signal designating this address is applied to the address bus, bit data items stored at the address are output in parallel to eight data bus lines in the form of digital signals "1" or "0". In this method, since eight bit data items are simultaneously output in response to one address signal, it is necessary to select a necessary bit from the output bit data items by the use of a gate circuit or the like. Further, in order to read the bit data items successively, it is necessary to output the address signal eight times and successively read the bit data items output in response to each address signal, and this involves the problem that it takes much time to read out bit signals. If data which has been stored at a particular address is word data, it is read out in parallel as it is in response to one address signal and then transmitted to the input/output circuit.

In the method shown in FIG. 15, since there is only one line in the data bus, each bit data item can be input or output in response to one address signal, but word data must be input or output in the form of temporally serial data by successively changing address signals. Since this method uses only one data bus line, the circuit configuration is simplified.

FIG. 16 exemplarily shows signals transmitted through the data and address buses shown in FIG. 15. If data stored in a particular memory area is bit data, since one bit data item is stored at one address, each bit data item can be read out immediately in response to one address signal. If data stored in a particular memory area is word data since word data is stored in such a manner that bits constituting each word data are scattered over eight consecutive addresses, it is necessary to successively output eight address signals in order to transmit data items read out from the respective addresses in the form of temporally serial data. Accordingly, it takes much time to transmit word data, and it is necessary for the reception side to provide a circuit for connecting the serial data into one word data.

The following is a description of the method of using an internal output in a program. The internal output is a result of a sequence processing which is not output to the outside but temporarily stored inside the PCS so as to be used for another sequence processing.

FIG. 17 is a table showing internal output assignments corresponding to the combination of the methods shown in FIGS. 7 and 8.

Since a bit output and a word output cannot be issued simultaneously for the same address in programming, care must be taken to avoid overlapping of the bit and word outputs, so that it takes much time to prepare a program.

For example, when the word data W2 is used, it is impossible to issue the output of eight bit data items B9 to B16, and it is necessary to arrange a program while calculating the number of bits that cannot be used, and this needs much time and labor and great care to prepare a program. Further, since one word data corresponds to eight bit data items, the number of available internal word outputs is an eighth of the number of available internal bit outputs.

FIG. 18 is a table showing internal output assignment corresponding to the combination of the methods shown in FIGS. 12 and 13. In this case also, problems similar to the above are encountered when a program is prepared, and since each word data is scattered over eight consecutive addresses, the number of available internal word outputs is reduced disadvantageously.

As described above, neither of the combination of the methods shown in FIGS. 7 and 8 nor the combination of the methods shown in FIGS. 12 and 13 can achieve both an increased memory utilizing efficiency and facilitated determination of addresses in programming and can attain the object to enable both bit data and word data to be readily handled.

One embodiment of the present invention will be described hereinunder with reference to FIGS. 1 to 6.

In this embodiment, the methods of using the memory area which are respectively shown in FIGS. 12 and 8 are combined together, and a memory area which corresponds to the number of bits constituting one word data (eight bits, in this embodiment) is ensured in advance for all the addresses. Accordingly, it is unnecessary to distinguish program addresses one from another, and when word processing is effected, there is no reduction in the number of remaining usable addresses. When word data is handled, all the bits are subjected to processing as shown in FIG. 2, whereas, when bit data is handled, one specific bit (generally either the least or highest significant bit) is processed.

Word processing or bit processing is selected according to the designation made by the program. In the case of bit processing, one specific bit is fixed at the least or highest, significant bit in advance. In consequence, as shown in FIG. 4, after the whole of bit data has been fetched to a microcomputer inside the PCS, the contents of the bit data can be output simply by shifting a register once in either direction so that the least or highest significant bit is output. Thus, the output speed can be increased.

FIG. 3 exemplarily shows word data and bit data which are mixedly stored. When word data and bit data are mixed together, for example, when one word data, five bit data items and one word data are consecutively stored from the address AAA0, in this embodiment the word data W1 is stored at the address AAA0, while the bit data items B2 to B6 are respectively stored at the addresses AAA1 to AAA5, and the word data W7 is stored at the address AAA6.

Thus, in this embodiment, both bit data and word data are stored in the same manner, that is, one data is stored at one address irrespective of whether it is bit data or word data, as shown in FIG. 3. Therefore, the numbers which are respectively put to data items stored at respective addresses can be consecutive numbers which are coincident with the ordinal numbers of the corresponding addresses regardless of the kind of data, that is, whether a particular data is word data or bit data. Accordingly, numbers which are respectively put to data items stored at respective addresses in preparation of a program are only required to be put according to the ordinal numbers of the corresponding addresses, so that it is possible to greatly reduce the time required to prepare a program. Further, since the area of a memory which is occupied by one bit data and that by one word data are equal to each other, eight bits in FIG. 3, it is possible to readily rewrite data stored at one address from bit data to word data and vice versa. In addition, even when bit data and word data are mixed together, there is no blank address, and therefore the memory utilizing efficiency is not lowered.

Exchange of data between the memory and an input/output circuit in accordance with this embodiment is shown in FIG. 4. In this embodiment, there are eight lines in the data bus, and therefore one word data can be handled with one address signal in a manner similar to that in the case of the method shown in FIG. 10. As to bit data, since the seventh bit alone is used, one bit data can be handled with one address signal in a manner similar to that in the case of the method shown in FIG. 15.

Accordingly, when bit data is handled, it is only necessary to examine a signal transmitted through a specific one of the eight lines of the data bus. It is therefore possible to read bit data or word data simply by generating an address signal only once, so that data transmission can be effected speedily.

The following is a description of the method of using the internal output in a program in accordance with this embodiment. FIG. 6 is a table showing internal output assignment in accordance with the present invention.

In this embodiment, both bit data and word data can be handled in the same way, and therefore it is only necessary to simply put consecutive numbers to data items stored in the memory. Accordingly, it is possible to facilitate preparation of a program, and the time required for programming is reduced by a large margin. In addition, it is possible to obtain a number of word outputs which is equal to the number of bit outputs and to readily replace bit data and word data one with the other. Thus, it is possible to obtain a programmable controller which has excellent flexibility and which is considerably convenient.

While preferred embodiments along with variations and modifications have been set forth, further embodiments, variations and modifications are contemplated according to the broader aspects of the present invention, all as set forth in the spirit and scope of the following claims.

What I claim is:

1. A data storing method, performed by a microcomputer in a programmable controller processing both fixed bit length word data and single bit data, and the microcomputer including an input/output circuit, a memory divided into a plurality of areas of equal length, each area having a bit length corresponding to the number of bits constituting one word data and a different addresses assigned to each of said areas, and a specific single bit data subarea at one of a highest significant bit and lowest significant bit in each of the areas, with the specific single bit data subarea being in the same location for all of said areas, the method comprising the steps of:

selecting one of word processing of the word data of the bit length of the areas and bit processing of the single bit data according to designations based on a program;

processing the word data to produce processed word data and storing the processed word data in all the bits of the entire bit length of one of the areas at a random address of the assigned addresses when word processing is selected;

processing the bit data to produce processed bit data and storing the processed bit data of a single bit length in only the specific single bit data subarea of one of the areas at a random address of the assigned addresses and leaving the other bits of the area as don't care bits when bit processing is selected; and thereafter, for at least one iteration, repeating said steps according to the program.

2. The data storing method according to claim 1, wherein said steps of processing and storing are controlled according to the program having consecutive numbers for addresses of said areas, with corresponding consecutive numbers to the word data stored respectively at said areas and corresponding consecutive numbers to the bit data stored respectively at said areas.

3. The data storing method according to claim 2, wherein said steps of storing include passing the processed word data over a single data bus having a plurality of lines connected in parallel to the memory and equal in number to the bit length of each area, and passing bit data only over a fixed one of the lines of the single data bus corresponding to the specific bit data subarea.

4. The data storing method according to claim 3, further including:

transferring both bit data and word data to and from the memory through the input/output circuit, respectively from and to the peripheral device external of the programmable controller.

5. The method according to claim 4, including transferring both the bit data and the word data on the single data bus between the memory and the input/output circuit.

6. The method according to claim 1, wherein said steps of storing include passing the word data over a single data bus having a plurality of lines connected in parallel to the memory and equal in number to the bit length of each area, and passing bit data only over a fixed one of the lines of the single data bus corresponding to the specific bit data subarea.

7. The data storing method according to claim 6, further including:

transferring both bit data and word data to and from the memory through the input/output circuit, respectively from and to a data peripheral device external of the programmable controller.

8. The method according to claim 7, including transferring both the bit data and the word data on the single data bus between the memory and the input/output circuit.

9. The data storing method according to claim 1, further including:

said steps of processing including fetching the word data and separately fetching the bit data from respective random memory areas; and transferring both bit data and word data to and from the memory through the input/output circuit, respectively from and to a data peripheral device external of the programmable controller.

10. A data storing method according to claim 1, wherein said steps of processing include processing all the bits of the area during word processing, and reading all the bits of said area into a shift register in parallel and then outputting the bit data in said specific single bit subarea by shifting said register during bit processing.

11. The data storing method according to claim 2, wherein said steps of processing and storing are controlled according to the program in such a manner that the word data and the bit data are stored sequentially at said areas.

12. A data storing method according to claim 3, wherein said steps of processing include processing all the bits of the area during word processing, and reading all the bits of said area into a shift register in parallel and then outputting the bit data in said specific single bit subarea by shifting said register during bit processing.

13. A data storing method according to claim 2, wherein said steps of processing include processing all the bits of the area during word processing, and reading all the bits of said area into a shift register in parallel and then outputting the bit data in said specific single bit subarea by shifting said register during bit processing.

* * * * *